United States Patent
Li et al.

(10) Patent No.: US 10,275,670 B1
(45) Date of Patent: Apr. 30, 2019

(54) IMAGE ANALYSIS TECHNOLOGIES FOR IDENTIFYING ABNORMAL VEHICLE CONDITIONS

(71) Applicant: STATE FARM MUTUAL AUTOMOBILE INSURANCE COMPANY, Bloomington, IL (US)

(72) Inventors: Yuntao Li, Champaign, IL (US); Dingchao Zhang, Normal, IL (US); Jeffrey S. Myers, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/914,745

(22) Filed: Mar. 7, 2018

(51) Int. Cl.
*G06K 9/00* (2006.01)
*B60R 25/30* (2013.01)
*B60R 25/25* (2013.01)
*G08B 21/22* (2006.01)
*B60R 25/102* (2013.01)

(52) U.S. Cl.
CPC ........ *G06K 9/00838* (2013.01); *B60R 25/102* (2013.01); *B60R 25/25* (2013.01); *B60R 25/305* (2013.01); *G06K 9/00221* (2013.01); *G08B 21/22* (2013.01)

(58) Field of Classification Search
CPC ..... G08B 21/02; G08B 21/245; G08B 25/016
USPC ....................................... 340/457, 573.1–576
See application file for complete search history.

(56) References Cited

U.S. PATENT DOCUMENTS

| | | | |
|---|---|---|---|
| 2005/0156725 A1* | 7/2005 | Muhammad | B60H 1/00735 340/457 |
| 2013/0238167 A1* | 9/2013 | Stanfield | G08G 1/20 701/2 |
| 2015/0235484 A1* | 8/2015 | Kraeling | G07C 5/0866 701/1 |
| 2017/0043783 A1* | 2/2017 | Shaw | B60H 1/00978 |
| 2017/0066406 A1* | 3/2017 | Ricci | B60R 25/102 |
| 2018/0211541 A1* | 7/2018 | Rakah | G08G 1/005 |

* cited by examiner

*Primary Examiner* — Joseph H Feild
*Assistant Examiner* — Sharmin Akhter
(74) *Attorney, Agent, or Firm* — Marshall, Gerstein & Borun LLP; Randall G. Rueth

(57) ABSTRACT

Systems and methods for using image analysis techniques to assess abnormal vehicle operating conditions are disclosed. According to aspects, a computing device may access and analyze image data depicting an individual(s) within a vehicle. Based on the depicted individuals(s) and optionally on other data, the computing device may determine that an abnormal condition exists. In response, the computing device may generate a notification and transmit the notification to an electronic device of an individual associated with the vehicle.

20 Claims, 7 Drawing Sheets

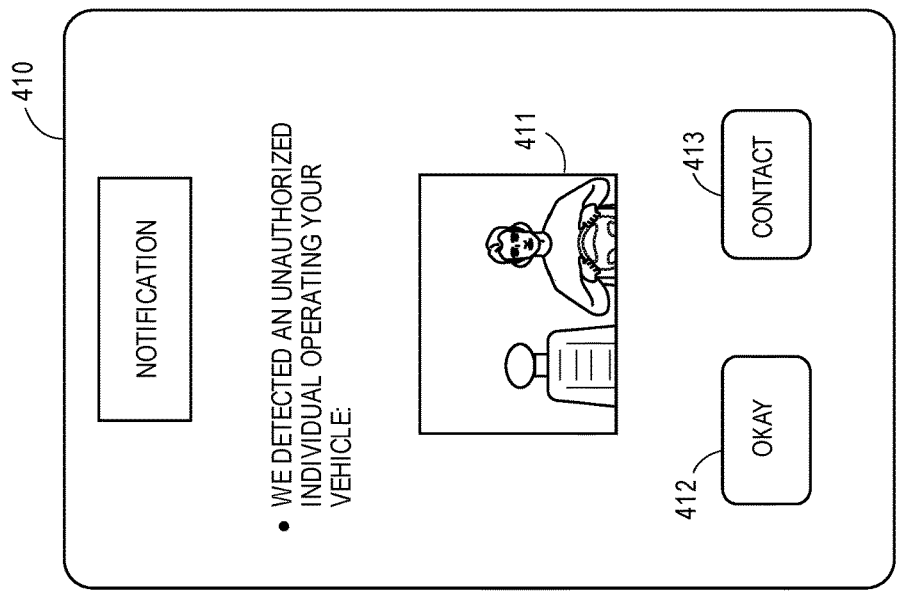
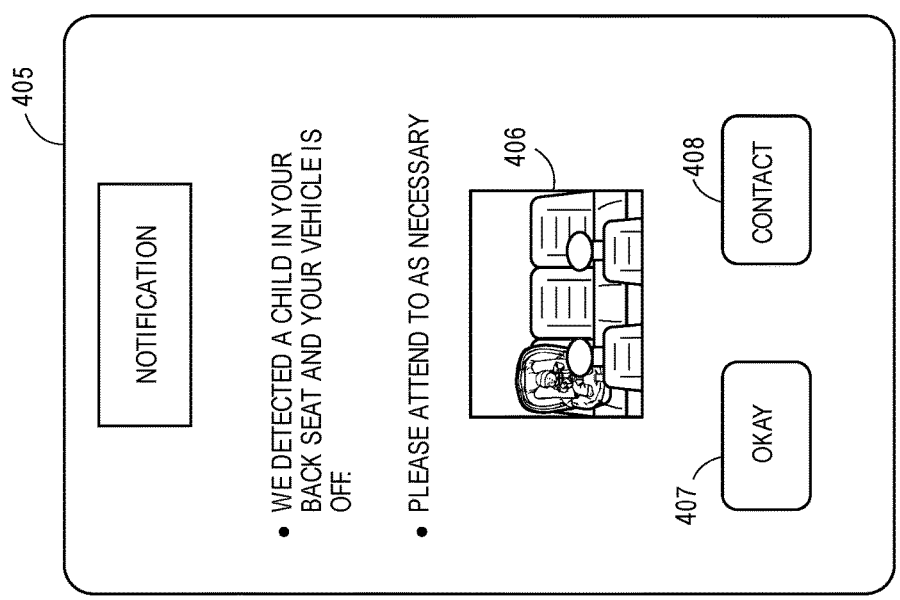
FIG. 4A
FIG. 4B

IMAGE ANALYSIS TECHNOLOGIES FOR IDENTIFYING ABNORMAL VEHICLE CONDITIONS

FIELD OF THE DISCLOSURE

The present disclosure is directed to image analysis technologies in association with vehicle operation. In particular, the present disclosure is directed to systems and methods for using image analysis techniques to detect abnormal vehicle operation conditions and appropriately notifying individuals.

BACKGROUND

Individuals frequently operate or otherwise travel in vehicles, where the environments and conditions of the vehicle operation may be varied. Generally, a given vehicle may have a set of "normal" operation conditions. For example, a vehicle may have associated one or more primary operators, such as an owner of the vehicle. As another example, a vehicle may typically operate with a consistent amount of individuals (i.e., the operator plus any additional passenger(s)).

However, vehicle technologies are limited in their ability to detect when vehicle operation conditions are abnormal or otherwise not consistent with normal conditions. In particular, existing infotainment components, display monitors, and cameras do not have the ability to detect and/or communicate abnormal conditions. Accordingly, vehicles may continue to operate under abnormal conditions, which may negatively affect vehicle safety, may violate certain policies or regulations, or may indicate illegal activity.

Therefore, there is an opportunity for techniques and technologies to detect abnormal vehicle operation conditions, and notify appropriate individuals of the abnormal vehicle operation conditions.

SUMMARY

In an embodiment, a system for assessing abnormal vehicle occupancy conditions within a vehicle is provided. The system may include a transceiver, at least one image sensor configured to capture image data, a non-transitory memory storing a set of computer-executable instructions, and a processor communicatively coupled to the transceiver, the at least one image sensor, and the memory. The processor may be configured to execute the computer-executable instructions to cause the processor to: access the image data from the at least one image sensor, the image data comprising a plurality of image frames depicting an interior of the vehicle, determine, from the plurality of image frames, at least a portion of image frames that depict a face of an individual located within the vehicle, analyze at least the portion of image frames to determine that an abnormal condition exists, the abnormal condition associated with the individual located within the vehicle, and in response to determining that the abnormal condition exists: generate a notification indicating the abnormal condition, and transmit, via the transceiver, the notification to an electronic device.

In another embodiment, a computer-implemented method of assessing abnormal vehicle occupancy conditions within a vehicle is provided. The method may include: accessing image data from at least one image sensor, the image data comprising a plurality of image frames depicting an interior of the vehicle, determining, by a processor from the plurality of image frames, at least a portion of image frames that depict a face of an individual located within the vehicle, analyzing, by the processor, at least the portion of image frames to determine that an abnormal condition exists, the abnormal condition associated with the individual located within the vehicle, and in response to determining that the abnormal condition exists: generating a notification indicating the abnormal condition, and transmitting, via a network connection, the notification to an electronic device.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 4A and 4B illustrate example interfaces associated with notifying individuals of detected abnormal conditions, in accordance with some embodiments.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present embodiments may relate to, inter alia, image analysis techniques for detecting abnormal instances or conditions associated with vehicle operation. The present embodiments may further relate to effectively and efficiently generating and communicating notifications or alerts of the abnormal conditions to appropriate individuals who may be associated with the vehicles.

According to certain aspects, systems and methods may capture image data including a plurality of image frames depicting a portion(s) of a vehicle. The systems and methods may identify those of the image frames that depict one or more individuals who are located within the vehicle. In analyzing the image frames, the systems and methods may facilitate one or more assessments in an effort to determine an existence of one or more abnormal vehicle conditions. For example, an abnormal vehicle condition may exist when an operator of the vehicle is unauthorized to operate the vehicle, when a child under a certain age is left unattended in the vehicle, when a passenger configuration is consistent with a rideshare, and/or other circumstances.

The systems and methods may further generate an alert or notification in response to detecting an abnormal condition (s). Additionally, the systems and methods may transmit the alert or notification to an electronic device of an individual associated with the vehicle, such as an electronic device belonging to an owner of the vehicle, where the electronic device may present the alert or notification for review by the individual, who may accordingly undertake appropriate action.

The systems and methods therefore offer numerous benefits. In particular, the systems and methods effectively determine abnormal vehicle conditions, and may automatically generate and communicate notifications in an attempt to alert an appropriate individual. Accordingly, certain risks or situations created by the abnormal conditions may be effectively and efficiently mitigated, thus increasing the safety of any individuals associated with the vehicle, as well as ensuring that the vehicle is operated as intended. It should be appreciated that additional benefits are envisioned.

Figure 1:
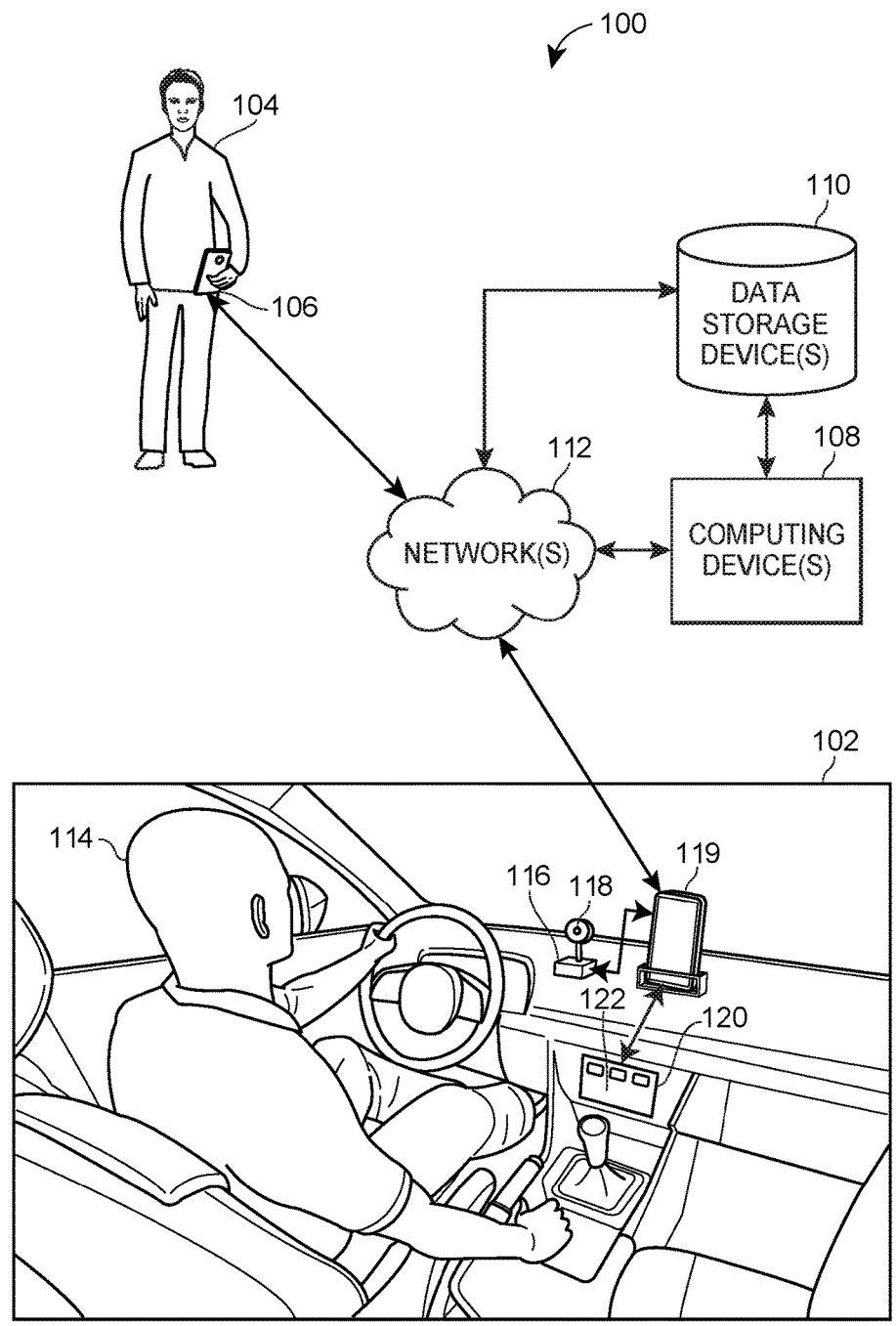
FIG. 1 depicts an overview of components and entities associated with the systems and methods, in accordance with some embodiments.

FIG. 1 illustrates a block diagram of an exemplary system 100 including components and entities configured to facilitate various of the functionalities as discussed herein, in particular detecting abnormal operating conditions and accordingly generating notifications. The system 100 may include both hardware and software components, as well as various data communication channels or links for communicating data between the various hardware and software components, as is described below.

The system 100 may include a vehicle, with an illustration 102 of a portion of the vehicle being shown in FIG. 1 for ease of illustration and explanation. The vehicle may be, for example, an automobile, car, truck, tow truck, snowplow, boat, motorcycle, motorbike, scooter, recreational vehicle, or any other type of vehicle capable of roadway or water travel. According to embodiments, the vehicle may be an autonomous vehicle capable of at least partial (or total) autonomous operation by a computer via the collection and analysis of various sensor data.

As depicted in FIG. 1, an interior of the vehicle may include one or more occupants, such as an operator 114 (and one or more passengers, not shown in FIG. 1); a monitoring device 116, which may include an image capturing component(s) 118 (e.g., a camera); a mobile computing device 119; and an infotainment device (or system) 120. The image capturing component(s) 118 may be configured to capture digital image data (e.g., in the form of one or more image frames) depicting various portions of the interior of the vehicle. For example, the image capturing component(s) 118 may capture image data that depicts a face, a body, and or another portion(s) of the operator 114. Additionally or alternatively, the image capturing component(s) 118 may capture image data that depicts a body (e.g., a face and/or other portion of a body) of a passenger (not shown in FIG. 1) in a front or rear seat of the vehicle. The monitoring device 116 may be located within or external to the vehicle. The monitoring device 116 may transmit, to the mobile computing device 119, any image data captured by the image capturing component(s) 118.

Each of the monitoring device 116 and the mobile computing device 119 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like. Further, each of the monitoring device 116 and the mobile computing device 119 may be equipped or configured with a set of sensors, such as a location module (e.g., a GPS chip), an image sensor, an accelerometer, a clock, a gyroscope, a compass, a yaw rate sensor, a tilt sensor, and/or other sensors. In some embodiments or under certain conditions, each of the monitoring device 116 and the mobile computing device 119 may function as thin-client devices that outsource some or most of the processing to one or more of back-end components.

The monitoring device 116 and/or the mobile computing device 119 may belong to or be otherwise associated with the operator 114 (or with another individual located in the vehicle), where the operator 114 may be an owner of the vehicle or otherwise associated with the vehicle. For example, the operator 114 may rent the vehicle for a variable or allotted time period, the operator 114 may at least partially operate the vehicle as part of a rideshare, and/or the operator 114 may have a policy for the vehicle.

The infotainment device 120 may be any suitable device (or system) that may provide suitable and/or desired information and/or entertainment content to one or more occupants, such as the operator 114. In one example, the infotainment device 120 may include a user interface 122 that may include a set of selections via which the operator 114 or other occupant(s) (such other occupants not being shown in FIG. 1) may access navigation information, driving statistics, traffic information, radio controls, and/or any other suitable information and/or entertainment content. The infotainment device 120 may communicate with the monitoring device 116 and/or the mobile computing device 119, such as via one or more wired or wireless connections.

The system 100 may further include a set of back-end components including a computing device(s) 108 and a data storage device(s) 110. Each of the infotainment device 120, the monitoring device 116, and the mobile computing device 119 may communicate with the back-end components via a network(s) 112. The network(s) 112 may include a proprietary network, a secure public internet, a virtual private network, and/or some other type of network, such as dedicated access lines, plain ordinary telephone lines, satellite links, cellular data networks, combinations of these and/or other types of networks. The network(s) 112 may utilize one or more radio frequency communication links to communicatively connect to any of the infotainment device 120, the monitoring device 116, and the mobile computing device 119. Where the network(s) 112 comprises the Internet or other data packet network, data communications may take place over the network(s) 112 via an Internet or other suitable data packet communication protocol. In some arrangements, the network(s) 112 additionally or alternatively includes one or more wired communication links or networks.

The computing device(s) 108 may include one or more servers or computing devices, which may be implemented as a server bank or cloud computing system. The computing device(s) 108 may include one or more computer processors adapted and configured to execute various software applications and components of the system 100, in addition to other software applications. The computing device(s) 108 may interface with the data storage device(s) 110, which may be configured to store data related to the operation of the vehicle and/or the operator 114, the environment and context in which the vehicle is operating, and/or other information. For example, the data storage device(s) 110 may be implemented as a data bank or a cloud data storage system, at least a portion of which may be locally accessed by the computing device(s) 108 using a local access mechanism such as a function call or database access mechanism, and/or at least a portion of which may be remotely accessed by the computing device(s) 108 using a remote access mechanism such as a communication protocol. The computing device(s) 108 may access data stored in the data storage device(s) 108 when executing various functions and tasks associated with the present disclosure.

To communicate with the computing device(s) 108, the infotainment device 120, the monitoring device 116, and/or the mobile computing device 119 may include a communication component(s) that are configured to transmit information to and receive information from the computing device(s) 108. The communication components may include one or more wireless transmitters or transceivers operating at any desired or suitable frequency or frequencies, and according to various communication protocols (e.g., GSM, CDMA, LTE, one or more IEEE 802.11 Standards such as Wi-Fi, WiMAX, BLUETOOTH, etc.).

As illustrated in FIG. 1, a user 104 may have an electronic device 106 capable of communication with other components of the system 100 via the network(s) 112. In particular, the electronic device 106 may communicate with any of the infotainment device 120, the monitoring device 116, the mobile computing device 119, and the computing device(s) 108. According to embodiments, the user 104 may be an individual associated with the vehicle. For example, the user 104 may own the vehicle and/or may be a policyholder of an insurance policy on the vehicle. According to embodiments, the electronic device 106 may be configured to receive and present any notifications, alerts, reports, or the like, as described herein.

Figure 2:
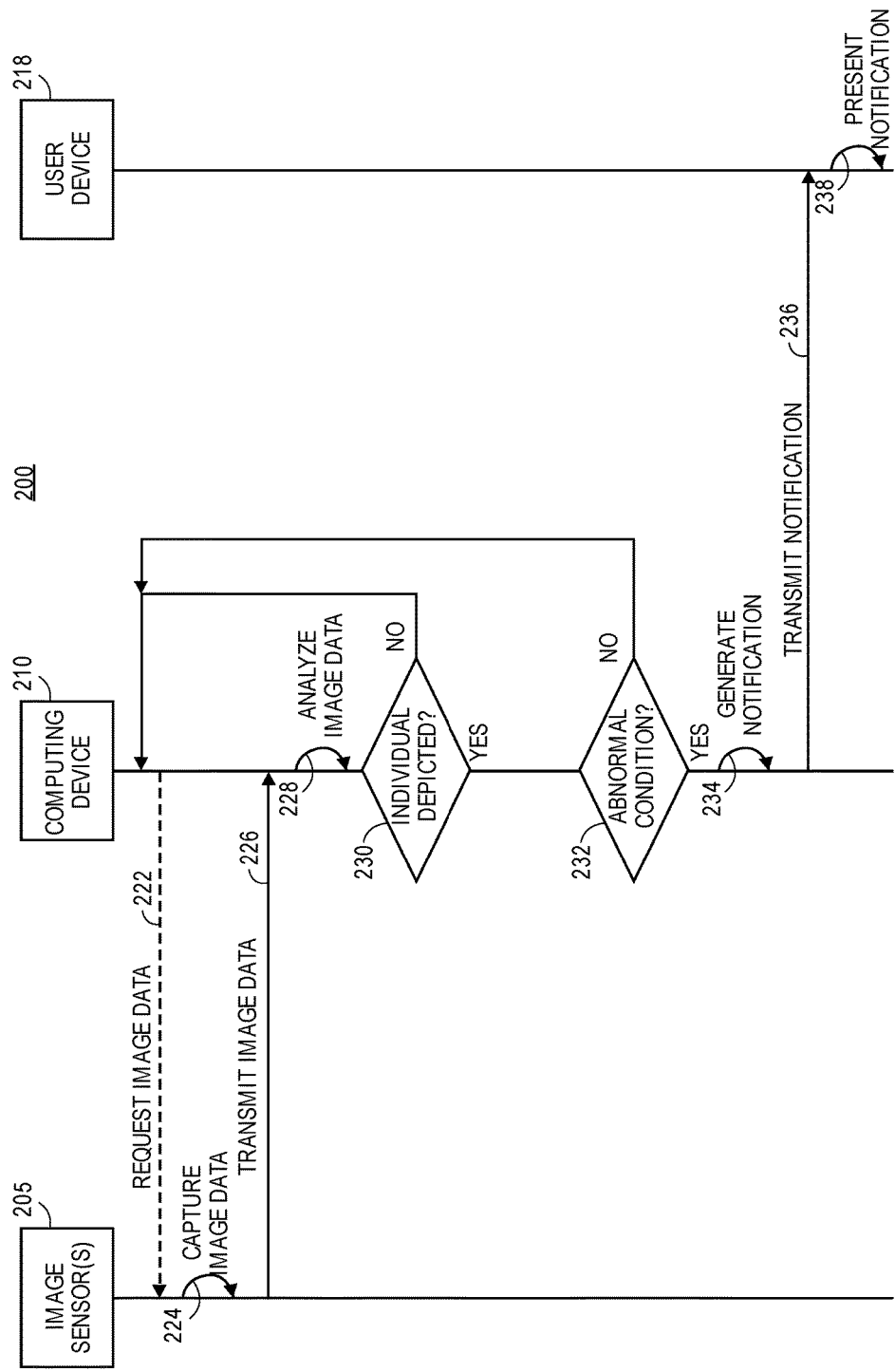
FIG. 2 depicts an example signal diagram associated with using image analysis to assess abnormal vehicle conditions, in accordance with some embodiments.

Generally, any of the computing device(s) 108, infotainment device 120, monitoring device 116, mobile computing device 119, or electronic device 106 may facilitate various of the functionalities as described herein, for example the image capture and analysis, the alert generation and presentation, the report generation, and/or other functionalities. Thus, the computing device(s) 108, infotainment device 120, monitoring device 116, mobile computing device 119, and/or electronic device 106 may communicate amongst each other and transmit any captured or analyzed data (e.g., the image data). FIG. 2 describes additional functionalities associated with various components of the system 100.

FIG. 2 depicts a signal diagram 200 describing certain functionalities associated with the systems and methods. The signal diagram 200 may include one or more image sensors 205, a computing device 210, and a user device 218 (such as the electronic device 106 as discussed with respect to FIG. 1). In an implementation, the image sensor(s) 205 may be incorporated in (or separate from) the computing device 210. The image sensor(s) 205 may be disposed within or external to a vehicle capable of operation by an operator, and may be third-party components and/or incorporated within components of the vehicle. The vehicle may transport the operator and optionally one or more passengers. The user device 218 may be separate from the computing device 210 and may be located external to (or within) the vehicle. Further, the user device 218 may be associated with an individual who is associated with the vehicle (e.g., an owner, lessee, or policyholder of the vehicle). The image sensor(s) 205 may be connected to the computing device 210 via one or more wired or wireless connections. The computing device 210 may be local to the vehicle (i.e., may be permanently or temporarily located within the vehicle) or may be remote from the vehicle.

The signal diagram 200 may begin when the computing device 210 optionally requests (222) image data from the image sensor(s) 205. According to embodiments, the computing device 210 may automatically request the image data periodically (e.g., once every ten seconds, once every minute, once every hour), or a user of the computing device 210 (e.g., the operator or a passenger of the vehicle) may cause the computing device 210 to request the image data. Further, the request may include a specified amount of image data (e.g., a number of image frames) and/or a specific time component (e.g., real-time image(s), real-time video, image(s) and/or video recorded five minutes ago).

The image sensor(s) 205 may capture (224) image data, such as according to the request received from the computing device 210. According to embodiments, the image sensor(s) 205 may be positioned so that one or more individuals (e.g., the operator or passenger(s) of the vehicle) are physically within view. In an embodiment, the image sensor(s) 205 may automatically capture the image data continuously or periodically. After capturing the image data, the image sensor(s) 205 may transmit (226) the image data to the computing device 210. In one implementation, the image sensor(s) 205 may automatically send the image data to the computing device 210 in real-time or near real-time as the image sensor(s) 205 captures the image data, and/or in response to a request from the computing device 210. In another implementation, the image sensor(s) 205 may send previously-captured image data to the computing device 210, such as if the image sensor(s) 205 interfaces with some type of memory or storage. It should be appreciated that the image data may depict the operator and/or a passenger(s) of the vehicle.

The computing device 210 may analyze (228) the image data, which may include a plurality of individual image frames. In particular, the computing device 210 may analyze the image data to determine (230) whether an individual(s) is depicted in the image data. It should be appreciated that the computing device 210 may analyze various image processing techniques to detect whether an individual(s) is depicted in the image data, as discussed herein. If an individual is not depicted ("NO"), processing may repeat, end, or proceed to other functionality. If an individual is depicted ("YES"), processing may proceed to (232).

At (232), the computing device 210 may determine whether an abnormal condition exists. According to embodiments, there may be multiple conditions that are classified as "abnormal" or disparate from "normal" conditions. In a particular instance, a normal condition may be when a vehicle is being operated by an individual who is authorized to operate the vehicle (e.g., an owner, lessee, or policyholder of the individual); and an abnormal condition may be when the vehicle is being operated by an individual who is not authorized to operate the vehicle.

In this instance, the computing device 210 may determine whether a face depicted in the image frames is known. In embodiments, a face recognition module may be configured to identify known and unknown faces. A database, such as a database implemented in a backend computing device (or within the computing device 210), may store images of known or authorized faces, where each face may be encoded into a vector of real numbers as a unique feature associated with each face. Additionally, a machine learning algorithm may compare a similarity between encodings of any two faces. If the similarly between a detected face and a stored (i.e., known or authorized) face is below a threshold metric, the detected face may be deemed as unknown or unauthorized. Similarly, if the similarity between a detected face and a stored face at least meets the threshold metric, the detected face may be deemed as known or authorized.

In another instance, an abnormal condition may be when the vehicle is solely occupied by a child (e.g., a child under the age of 10, or another age). In this instance, the computing device 210 may analyze the relevant image data (in particular, the image data that depicts a face of an individual) to estimate an age of the depicted individual. This analysis may be supplemented with an analysis of the image data that reveals other conditions relevant to the age of the depicted individual, such as a location of the individual within the vehicle (e.g., the back seat), whether the individual is alone or unattended within the vehicle, whether the individual is sitting in a car seat, and/or other relevant conditions. If the estimated age of the depicted individual is below a threshold age, then the depicted individual may be deemed to be a child under a certain age. Similarly, if the estimated age of the depicted individual at least meets a threshold age, then the depicted individual may be deemed to not be a child.

In embodiments, the computing device 210 may account for various environmental or situational conditions that may affect the determination of this abnormal condition. For example, the computing device 210 may access various sensor data indicative of any open door(s) and/or window(s) of the vehicle, an internal temperature, an external temperature, a location, an operating status of the vehicle (e.g., on or off).

In a particular situation, a child situated in a car seat may solely occupy a vehicle but only because an adult individual is in the process of taking the child out of the car seat. In this situation, the computing device 210 may determine that because the vehicle was recently shut off and that the child's door is open, an abnormal condition does not exist. In another situation, the computing device 210 may determine that a child is located within a vehicle, the vehicle is off, and the external temperature is above a threshold temperature. In this situation, the computing device 210 may determine that an abnormal condition exists. It should be appreciated that additional situations are envisioned.

In a further instance, an abnormal condition may exist when there are an amount of individuals located within the vehicle that exceeds a "normal" amount of individuals. In particular, the vehicle may be configured for a maximum occupancy (e.g., 7 people in an SUV). Additionally or alternatively, the vehicle may have a policy, agreement, or the like, having an associated maximum number of vehicle occupants. For example, an insurance policy of the vehicle may specify that the vehicle is not to be used as part of a ridesharing service.

In this instance, the computing device 210 may analyze the image data to determine how many individuals are located in the vehicle, as well as a positioning (e.g., passenger seat, drivers seat, or back seat) of each of the individuals. Based on the number of individuals and/or on the positioning of the individuals, the computing device 210 may determine that an abnormal condition exists. For example, the computing device 210 may determine that there are eight (8) individuals present in a vehicle having a maximum occupancy of seven (7), and therefore deem that an abnormal occupancy condition exists. As an additional example, the computing device 210 may determine that a vehicle is being operated by an operator, with two additional vehicles in the back seat and no passenger in the passenger seat, which may be representative of a rideshare situation, and therefore deem that an abnormal occupancy condition exists.

It should be appreciated that other abnormal conditions are envisioned, with the computing device 210 able to analyze any combination of image data, sensor data, external data, and/or the like.

If the computing device 210 determines that an abnormal condition does not exist ("NO"), processing may repeat, end, or proceed to other functionality. In contrast, if the computing device 210 determines that an abnormal condition exists ("YES"), the computing device 210 may generate (234) a notification that indicates the abnormal condition. In embodiments, the notification may be in graphical form (e.g., including text and/or images), or may be in audible form (e.g., automatically generated audio that describes the abnormal condition).

The computing device 210 may transmit (236) the notification to the user device 218. After receiving the notification, the user device 218 may present (238) the notification. In particular, the user device 218 may present the notification via a user interface, either graphically, audibly, or some other form of presentation. Thus, the individual associated with the user device 218 may review the notification and initiate any corrective or mitigating actions to address the detected abnormal condition.

Generally, various functionalities associated with the systems and methods are envisioned. The functionalities may be facilitated or performed by a combination of components discussed herein, such as the image sensor(s) 205, the computing device 210, and/or the user device 218 as discussed with respect to FIG. 2.

In particular, image frames may be captured and monitored for the detection of a depicted face of an individual, and facial detection using facial landmarks may be performed. After facial regions are determined, the components may compute a series of metrics describing facial attributes and movement to determine reference values indicating a normal state of the individual (e.g., over the first 10 frames), which may include the individual's standard posture, facial characteristics, and/or the like. According to embodiments, the reference values may have respective lower bounds and upper bounds.

The components may determine whether a face depicted in the image frames is known. In embodiments, a face recognition module may be configured to identify known and unknown faces. A database, such as a database implemented in a backend computing device, may store images of known faces, where each face may be encoded into a vector of real numbers as a unique feature associated with each face. Additionally, a machine learning algorithm may compare a similarity between encodings of any two faces.

If the similarly between a detected face and a stored (i.e., known) face is below a threshold metric, the detected face may be deemed as unknown or unauthorized and may be indicated as such (e.g., displayed within a red box in a user interface). In an embodiment, the components may capture or record an image of an unknown or unauthorized face and may send the image to a relevant individual (e.g., an owner of the vehicle). If the face is known, the components may measure metrics depicted in image frames based on the determined reference values, in an attempt to determine alternative abnormal conditions. In particular, the components may analyze subsequent image frames to calculate depicted metrics and compare the calculated metrics to the determined reference values.

Generally, the components may be configured to employ various image analysis techniques to determine an amount of individuals within the vehicle as well as a position of each individual within the vehicle. Additionally or alternatively, the components may employ various image analysis techniques to estimate an age of an individual(s) within the vehicle. In particular, the components may segment out, using a deep learning neural network model from an image frame, a facial region of an individual along with certain facial landmarks. Additionally, the components may measure color and texture information about the skin areas on the face. Further, the components may use an intelligent sliding window algorithm to assess color, texture, and shape information and determine a potential conditions associated with the facial region. The components may further measure how many consecutive image frames maintain a certain detected condition.

The components may also record metric data resulting from the image analysis. In particular, the metric data may indicate any measured metrics, their association with respective thresholds or detected conditions, occurrence times and locations, and/or other data. Additionally, the components may monitor for the vehicle to stop or cease operation, such as if a trip ends, the vehicle is turned off, or other conditions in which the vehicle is no longer operating. The components may generate a driving report after the vehicle is stopped or otherwise after a trip is completed, and where the driving report may include any generated metric data. Further, the driving report may be synced to a designated mobile device for review by an appropriate individual. The driving report may contain a summary of detected vehicle operating conditions, time-evolving graphs of tracked statistics, comparisons with driving histories to help operators keep track of their driving patterns, and/or other information.

Figure 3A:
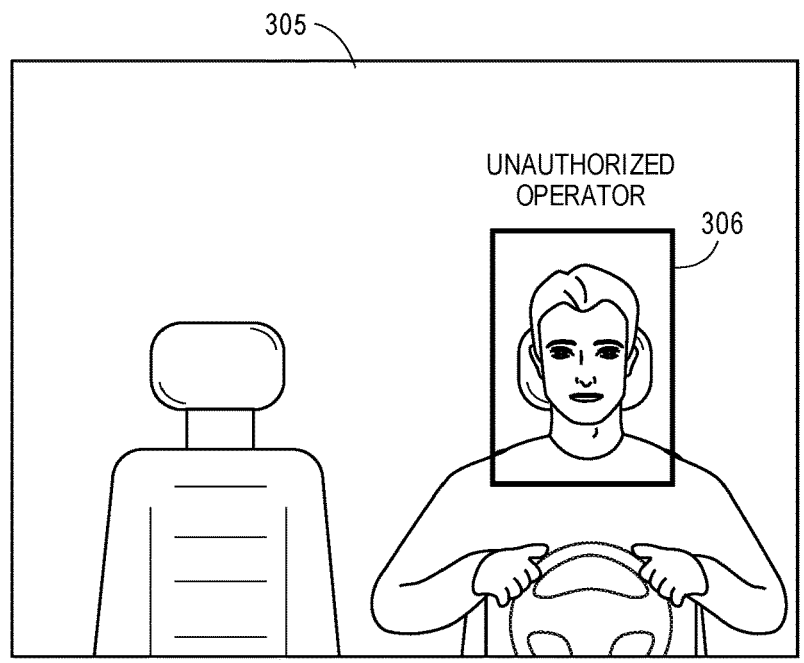
FIGS. 3A-3C illustrate example interfaces associated with processing image frames included in image data, in accordance with some embodiments.
Figure 3B:
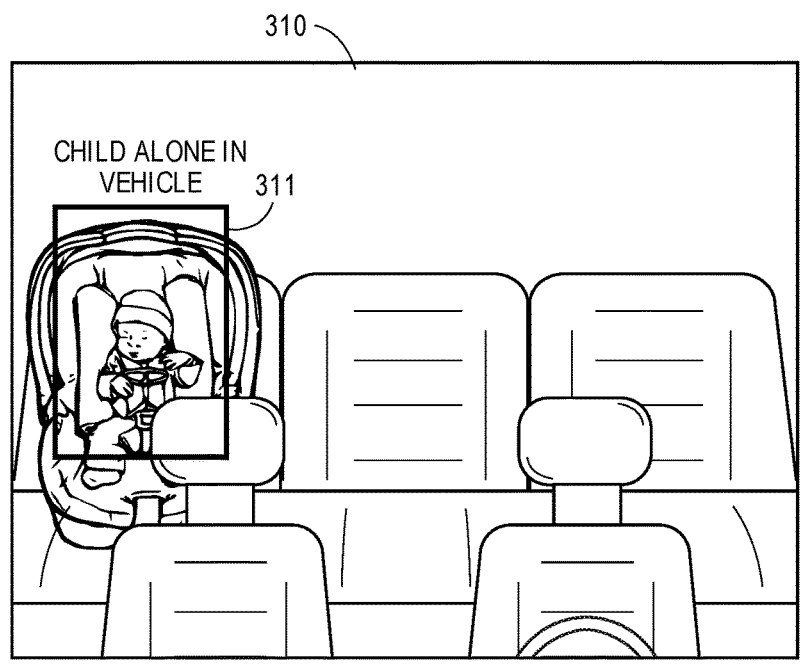
Figure 3C:
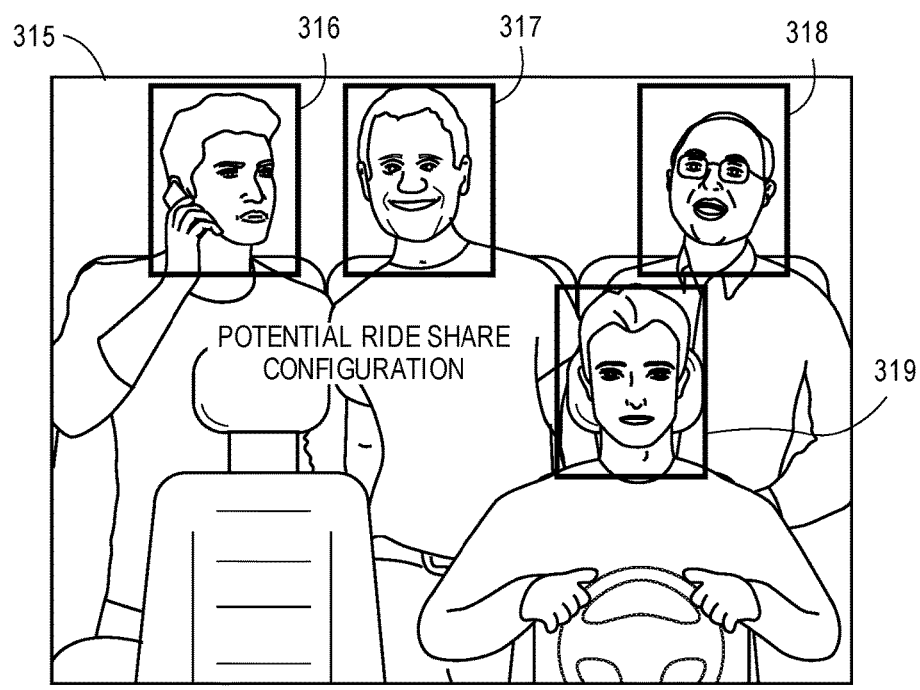

FIGS. 3A-3C depict example interfaces associated with processing image frames included in image data, where the image frames depict various configurations of individual(s) located within vehicle(s). The interfaces include a representation of respective image frames as well as identifications of conditions that may be determined during an analysis of the respective image frames. In embodiments, a computing device may be configured to display the interfaces, where the computing device may or may not be the device that analyzes the image frames. It should be appreciated that the interfaces are merely exemplary, and that additional and alternative content is envisioned.

FIG. 3A is an interface 305 illustrating an exemplary abnormal condition, namely, an unauthorized vehicle operator. In operation, a computing device may analyze the image data associated with the interface 305 to assess whether the vehicle operator is authorized to operate the vehicle, such as by checking facial recognition data against a record of authorized individuals.

After determining that the vehicle is unauthorized, the computing device may cause an indication 306 of the unauthorized vehicle operator to be displayed (as shown, a box around the unauthorized operator's face), along with textual content indicating the same. The computing device may also send the interface 305 to or otherwise cause the interface 305 to be presented on an electronic device of an appropriate individual associated with the vehicle. Accordingly, the appropriate individual (e.g., an owner of the vehicle) may review the interface 305 and determine whether and how to take appropriate action.

FIG. 3B is an interface 310 illustrating an exemplary abnormal condition, namely, an unattended child in the back seat of a vehicle. In operation, a computing device may analyze the image data associated with the interface 310 to assess whether the individual is a child, as well as whether the child's presence and other environmental condition(s) represent an abnormal condition.

After determining that the unattended child represents an abnormal condition, the computing device may cause an indication 311 of the child to be displayed, along with textual content indicating the same. The computing device may also send the interface 310 to or otherwise cause the interface 310 to be presented on an electronic device of an appropriate individual associated with the vehicle. Accordingly, the appropriate individual (e.g., an owner of the vehicle) may review the interface 310 and determine whether and how to take appropriate action.

FIG. 3C is an interface 315 illustrating an exemplary abnormal condition, namely, a passenger configuration that is particular to ride sharing. In operation, a computing device may analyze the image data associated with the interface 315 to assess whether the depicted passenger configuration is particular to a rideshare situation (as shown: a vehicle operator, an empty passenger seat, and three individuals in the back seat of the vehicle).

After determining that the configuration is particular to a rideshare situation, the computing device may cause a set of indications 316, 317, 318 respectively associated with the detected passengers to be displayed, along with textual content indicating the same. The computing device may also send the interface 315 to or otherwise cause the interface 315 to be presented on an electronic device of an appropriate individual or entity associated with the vehicle. Accordingly, the appropriate individual or entity (e.g., a company that issued a policy associated with the vehicle) may review the interface 315 and determine whether and how to take appropriate action.

FIGS. 4A and 4B depict example interfaces that may be displayed on an electronic device, such as the user device 218 as discussed with respect to FIG. 2. In particular, the electronic device may display the interfaces in response to receiving a notification(s) of a detected abnormal condition(s) associated with vehicle operation. It should be appreciated that the interfaces are merely exemplary, and that additional and alternative content is envisioned.

FIG. 4A illustrates an interface 405 including a notification of a detected abnormal condition, namely, a child located in the back seat of a vehicle that is off. In addition to the notification, the interface 405 may include an image 406 that depicts the abnormal condition (e.g., the image in FIG. 3B), as well as an okay selection 407 and a contact selection 408. A user of the electronic device may select the okay selection 407 to cause the interface 405 to be dismissed, and/or may select the contact selection 408 to initiate a communication to a designated individual (e.g., a caregiver).

FIG. 4B illustrates an interface 410 including a notification of an unauthorized individual operating a vehicle. In addition to the notification, the interface 410 may include an image 411 that depicts the abnormal condition (e.g., the image in FIG. 3A), as well as an okay selection 412 and a contact selection 413. A user of the electronic device may select the okay selection 412 to cause the interface 410 to be dismissed, and/or may select the contact selection 413 to initiate a communication to a designated individual or entity (e.g., the police).

Figure 5:
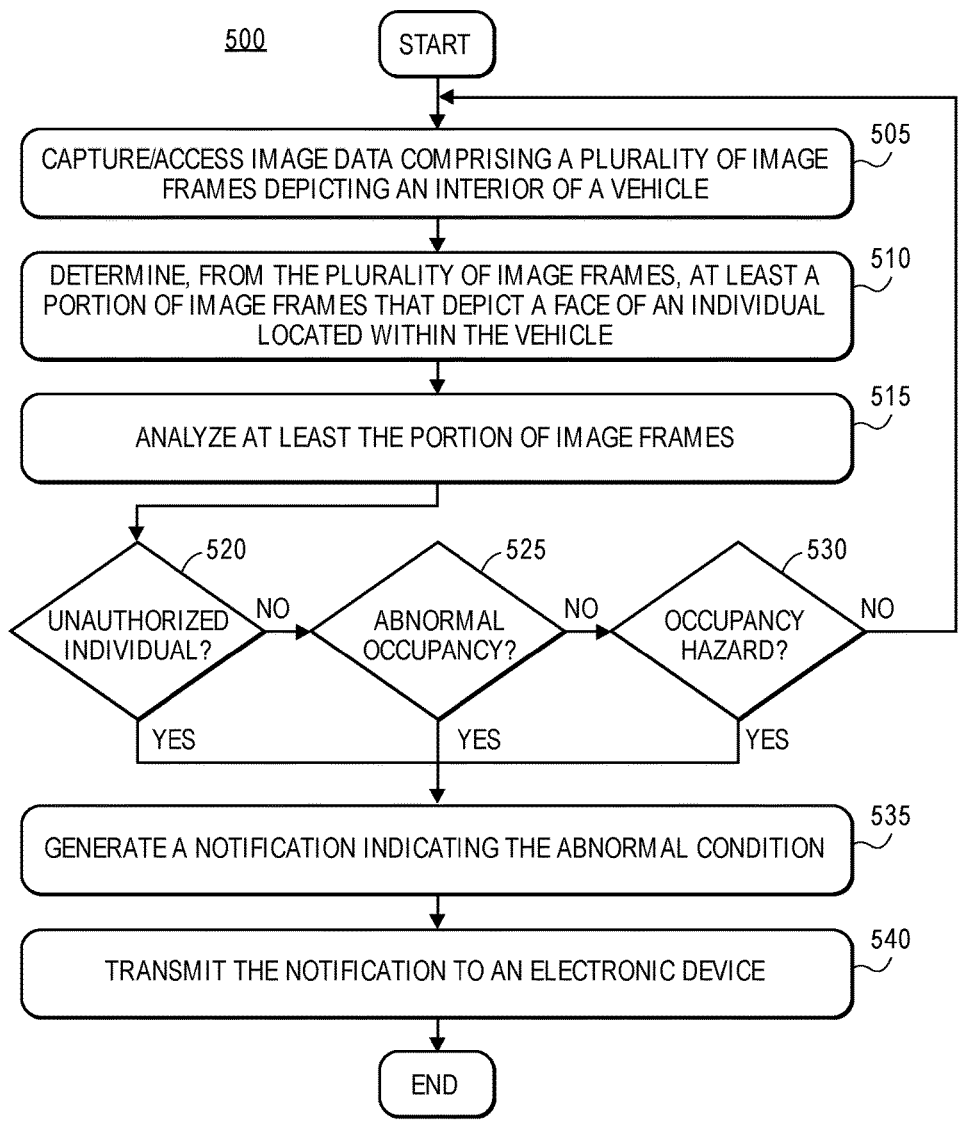
FIG. 5 depicts a block diagram of an example method of assessing abnormal vehicle occupancy conditions within a vehicle, in accordance with some embodiments.

FIG. 5 depicts a block diagram of an example method 500 of assessing abnormal vehicle occupancy conditions within a vehicle. The method 500 may be facilitated by at least one computing device that may be associated with the vehicle, where the computing device may be on board the autonomous vehicle. The computing device may be configured to communicate with one or more electronic devices or components, such as one or more image sensors as well as a user device.

The method 500 may begin when the computing device captures and/or accesses (block 505) image data, where the image data may include a plurality of image frames depicting an interior of the vehicle. According to embodiments, the computing device may access the image data from an external camera or image sensor that may continuously capture the image data, or may include a built-in camera that captures the image data.

The computing device may determine (block 510), from the plurality of image frames, at least a portion of the image frames that depict a face of an individual located within the vehicle. In embodiments, at least the portion of the image frames may depict faces of multiple respective individuals located within the vehicle.

The computing device may analyze (block 515) at least the portion of image frames to determine whether an abnormal condition exists. In particular, the computing device may analyze at least the portion of image frames to determine (block 520) whether an individual (e.g., the operator of the vehicle) is authorized. In embodiments, the computing device may determine, using a facial recognition technique on at least the portion of image frames that depict the face of the individual, a facial recognition result, and may determine that the facial recognition result is not included in a listing of authorized individuals for the vehicle. In a particular implementation, the computing device may transmit the facial recognition result to a backend server, where the backend server may be configured to check the facial recognition result against the listing of authorized individuals for the vehicle, and receive, from the backend server, an indication that the facial recognition result is not included in the listing of authorized individuals for the vehicle.

If the computing device determines that the individual is unauthorized ("YES"), processing may proceed to block 535. In contrast, if the computing device determines that the individual is not unauthorized ("NO"), the computing device may determine (block 525) whether an abnormal occupancy condition exists. In particular, the computing device may determine, from the plurality of image frames, at least the portion of image frames that depict a plurality of faces of a plurality of individuals located within the vehicle. Additionally, the computing device may determine that an amount of the plurality of individuals located within the vehicle exceeds a normal amount of individuals associated with the vehicle. In an implementation, the computing device may access a policy associated with the vehicle, where the policy may indicate the normal amount of individuals associated with the vehicle, and may determine that the amount of the plurality of individuals located within the vehicle exceeds the normal amount of individuals associated with the vehicle.

If the computing device determines that an abnormal occupancy condition exists ("YES"), processing may proceed to block 535. In contrast, if the computing device determines that an abnormal occupancy condition does not exist ("NO"), the computing device may determine (block 530) whether an occupancy hazard exists. In embodiments, the computing device may analyze at least the portion of image frames to estimate an age of the individual, wherein the age of the individual may be less than a threshold age. Additionally, in response to estimating the age of the individual, the computing device may access a set of sensor data associated with an environment of the vehicle, and may determine that at least one parameter associated with the set of sensor data meets or exceeds at least one condition.

The computing device may further account for a set of environmental conditions or characteristics. In an implementation, the set of sensor data may include an outside temperature and an operating condition of the vehicle (e.g. on or off), and may determine that (i) the outside temperature exceeds a temperature threshold, and (ii) the operating condition of the vehicle is off, which may represent an occupancy hazard. If the computing device determines that an occupancy hazard exists ("YES"), processing may proceed to block 535. In contrast, if the computing device determines that an occupancy hazard does not exist ("NO"), processing may end, repeat, or proceed to other functionality. It should be appreciated that the functionalities of one or more of 520, 525, and 530 may be performed in any order.

At block 535, the computing device may generate a notification indicating the abnormal condition. In embodiments, the notification may indicate textual and/or graphical content that summarizes or identifies the abnormal condition, including any captured images from the interior of the vehicle. The computing device may further transmit (block 540) the notification to an electronic device, where the electronic device may belong to an individual associated with the vehicle. Additionally, the electronic device may present the notification for review by the individual and to enable the individual to facilitate any corrective or mitigating actions.

Figure 6:
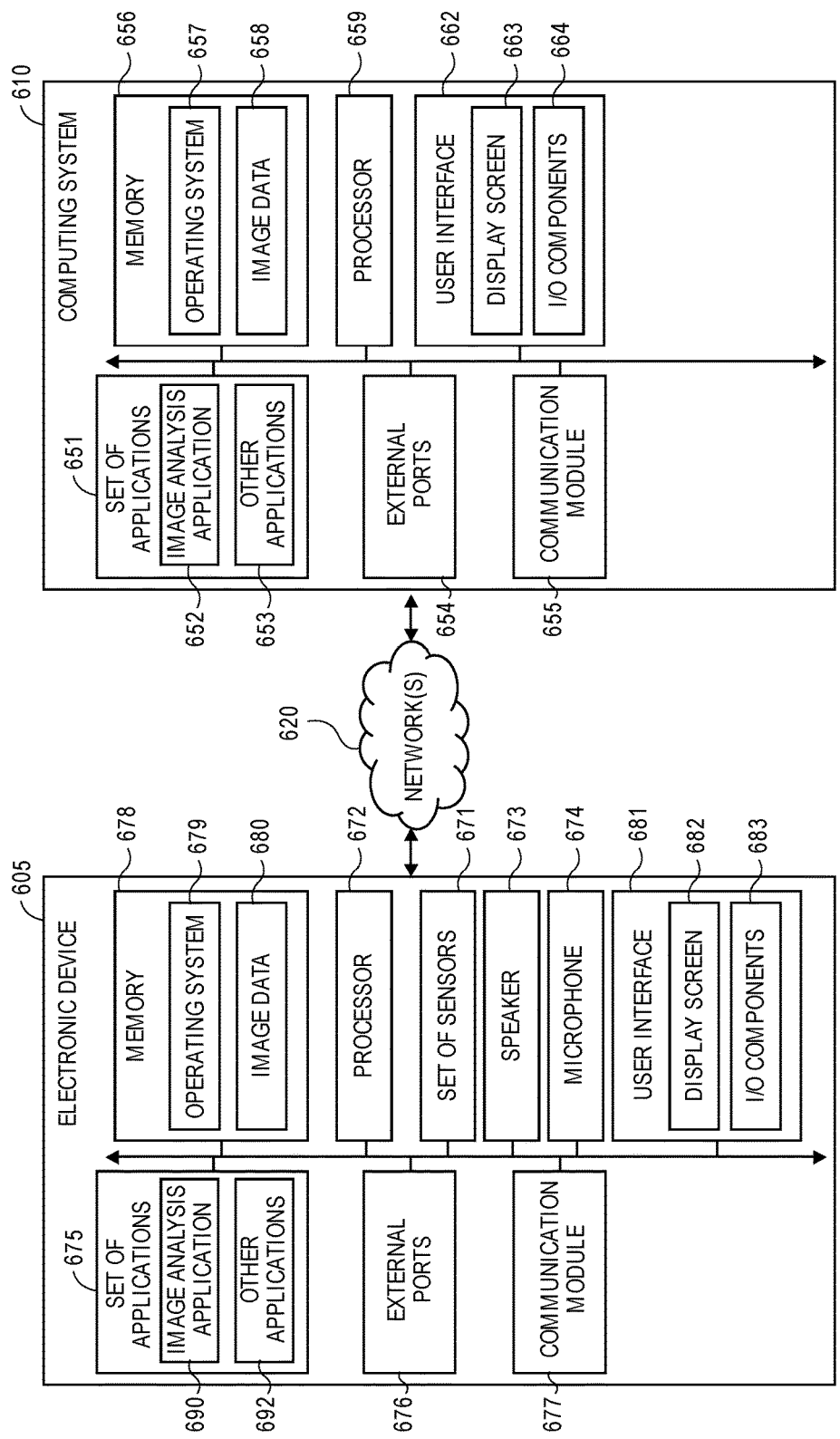
FIG. 6 is a hardware diagram of an example electronic device and an example computing system, in accordance with some embodiments.

FIG. 6 illustrates a hardware diagram of an example electronic device 605 (such as the infotainment device 120, the monitoring device 116, or the mobile computing device 119 as discussed with respect to FIG. 1, or the computing device 210 as discussed with respect to FIG. 2) and an example computing system 610 (such as the computing device 108 as discussed with respect to FIG. 1), in which the functionalities as discussed herein may be implemented.

The electronic device 605 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be an image analysis application 690 configured to facilitate various of the functionalities as discussed herein. It should be appreciated that one or more other applications 692 are envisioned, such as an autonomous vehicle operation application.

The processor 672 may interface with the memory 678 to execute the operating system 679 and the set of applications 675. According to some embodiments, the memory 678 may also include image data 680 including data accessed or collected from image sensor(s). The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 605 may further include a communication module 677 configured to communicate data via one or more networks 620. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 may interface with another device, component, or sensors via the network(s) 620 to retrieve sensor data.

The electronic device 605 may include a set of sensors 671 such as, for example, a location module (e.g., a GPS chip), an image sensor, an accelerometer, a clock, a gyroscope, a compass, a yaw rate sensor, a tilt sensor, telematics sensors, and/or other sensors. The electronic device 605 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs). According to some embodiments, the user may access the electronic device 605 via the user interface 681 to review information such as alerts or notifications, make selections, and/or perform other functions. Additionally, the electronic device 605 may include a speaker 673 configured to output audio data and a microphone 674 configured to detect audio.

In some embodiments, the electronic device 605 may perform the functionalities as discussed herein as part of a "cloud" network or may otherwise communicate with other hardware or software components within the cloud to send, retrieve, or otherwise analyze data.

As illustrated in FIG. 6, the electronic device 605 may communicate and interface with the computing system 610 via the network(s) 620. The computing system 610 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be an image analysis application 652 configured to facilitate various of the functionalities discussed herein. It should be appreciated that one or more other applications 653 are envisioned.

The processor 659 may interface with the memory 656 to execute the operating system 657 and the set of applications 651. According to some embodiments, the memory 656 may also include image data 658, such as image data that is transmitted to the computing system 610 from the electronic device 605. The memory 656 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The computing system 610 may further include a communication module 655 configured to communicate data via the one or more networks 620. According to some embodiments, the communication module 655 may include one or more transceivers (e.g., WWAN, WLAN, and/or WPAN transceivers) functioning in accordance with IEEE standards, 3GPP standards, or other standards, and configured to receive and transmit data via one or more external ports 654. For example, the communication module 655 may receive, from the electronic device 605, a set(s) of image data.

The computing device 610 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs). According to some embodiments, the user may access the computing device 610 via the user interface 662 to review information, make changes, input training data, and/or perform other functions.

In some embodiments, the computing device 610 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a specialpurpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A system for assessing abnormal vehicle occupancy conditions within a vehicle, comprising:
   a transceiver;
   at least one image sensor configured to capture image data;
   a non-transitory memory storing a set of computer-executable instructions; and
   a processor communicatively coupled to the transceiver, the at least one image sensor, and the memory, and configured to execute the computer-executable instructions to cause the processor to:
      access the image data from the at least one image sensor, the image data comprising a plurality of image frames depicting an interior of the vehicle,
      determine, from the plurality of image frames, at least a portion of image frames that depict a plurality of faces of a plurality of individuals located within the vehicle,
      analyze at least the portion of image frames to determine a plurality of positions within the vehicle at which the plurality of individuals are respectively located, wherein the plurality of positions indicates a first individual of the plurality of individuals located in a driver's seat of the vehicle and a remainder of the plurality of individuals located in a back seat of the vehicle,
      determine, based on the plurality of positions within the vehicle at which the plurality of individuals are respectively located, that an abnormal condition exists, and
      in response to determining that the abnormal condition exists:
         generate a notification indicating the abnormal condition, and
         transmit, via the transceiver, the notification to an electronic device.

2. The system of claim 1, wherein the processor is further configured to:
   analyze at least the portion of image frames to determine that an individual of the plurality of individuals located within the vehicle is unauthorized.

3. The system of claim 2, wherein to analyze at least the portion of image frames to determine that the individual of the plurality of individuals located within the vehicle is unauthorized, the processor is configured to:
   determine, using a facial recognition technique on at least the portion of image frames that depict the face of the individual, a facial recognition result, and
   determine that the facial recognition result is not included in a listing of authorized individuals for the vehicle.

4. The system of claim 2, wherein to determine that the facial recognition result is not included in the listing of authorized individuals for the vehicle, the processor is configured to:
   transmit the facial recognition result to a backend server via the transceiver, the backend server configured to check the facial recognition result against the listing of authorized individuals for the vehicle, and
   receive, from the backend server via the transceiver, an indication that the facial recognition result is not included in the listing of authorized individuals for the vehicle.

5. The system of claim 2, wherein the notification further indicates that the individual located within the vehicle is unauthorized, and wherein the electronic device is associated with an owner of the vehicle.

6. The system of claim 1, wherein the processor is further configured to:
   determine that an amount of the plurality of individuals located within the vehicle exceeds a normal amount of individuals associated with the vehicle.

7. The system of claim 6, wherein to determine that the amount of the plurality of individuals located within the vehicle exceeds the normal amount of individuals associated with the vehicle, the processor is configured to:
   access a policy associated with the vehicle, the policy indicating the normal amount of individuals associated with the vehicle, and
   determine that the amount of the plurality of individuals located within the vehicle exceeds the normal amount of individuals associated with the vehicle.

8. The system of claim 1, wherein the processor is further configured to:
   analyze at least the portion of image frames to estimate an age of an individual of the plurality of individuals, wherein the age of the individual is less than a threshold age.

9. The system of claim 8, wherein the processor is further configured to:
   in response to estimating the age of the individual:
      access a set of sensor data associated with an environment of the vehicle, and
      determine that at least one parameter associated with the set of sensor data meets or exceeds at least one condition.

10. The system of claim 9, wherein the set of sensor data comprises an outside temperature and an operating condition of the vehicle, and wherein to determine that the at least one parameter associated with the set of sensor data meets or exceeds at least one condition, the processor is configured to:
    determine that (i) the outside temperature exceeds a threshold temperature, and (ii) the operating condition of the vehicle is off.

11. A computer-implemented method of assessing abnormal vehicle occupancy conditions within a vehicle, the method comprising:
    accessing image data from at least one image sensor, the image data comprising a plurality of image frames depicting an interior of the vehicle;
    determining, by a processor from the plurality of image frames, at least a portion of image frames that depict a plurality of faces of a plurality of individuals located within the vehicle;
    analyzing, by the processor, at least the portion of image frames to determine a plurality of positions within the vehicle at which the plurality of individuals are respectively located; wherein the plurality of positions indicates a first individual of the plurality of individuals located in a driver's seat of the vehicle and a remainder of the plurality of individuals located in a back seat of the vehicle,
    determining, by the processor based on the plurality of positions within the vehicle at which the plurality of individuals are respectively located, that an abnormal condition exists; and
    in response to determining that the abnormal condition exists:
       generating a notification indicating the abnormal condition, and
       transmitting, via a network connection, the notification to an electronic device.

12. The computer-implemented method of claim 11, further comprising:
    analyzing at least the portion of image frames to determine that an individual of the plurality of individuals located within the vehicle is unauthorized.

13. The computer-implemented method of claim 12, analyzing at least the portion of image frames to determine that the individual of the plurality of individuals located within the vehicle is unauthorized comprises:
    determining, using a facial recognition technique on at least the portion of image frames that depict the face of the individual, a facial recognition result; and
    determining that the facial recognition result is not included in a listing of authorized individuals for the vehicle.

14. The computer-implemented method of claim 12, wherein determining that the facial recognition result is not included in the listing of authorized individuals for the vehicle comprises:
    transmitting the facial recognition result to a backend server, the backend server configured to check the facial recognition result against the listing of authorized individuals for the vehicle; and
    receiving, from the backend server, an indication that the facial recognition result is not included in the listing of authorized individuals for the vehicle.

15. The computer-implemented method of claim 12, wherein the notification further indicates that the individual located within the vehicle is unauthorized, and wherein the electronic device is associated with an owner of the vehicle.

16. The computer-implemented method of claim 11, further comprising:
    determining that an amount of the plurality of individuals located within the vehicle exceeds a normal amount of individuals associated with the vehicle.

17. The computer-implemented method of claim 16, wherein determining that the amount of the plurality of individuals located within the vehicle exceeds the normal amount of individuals associated with the vehicle comprises:
    accessing a policy associated with the vehicle, the policy indicating the normal amount of individuals associated with the vehicle; and
    determining that the amount of the plurality of individuals located within the vehicle exceeds the normal amount of individuals associated with the vehicle.

18. The computer-implemented method of claim 11, further comprising:
    analyzing at least the portion of image frames to estimate an age of an individual of the plurality of individuals, wherein the age of the individual is less than a threshold age.

19. The computer-implemented method of claim 18, further comprising:
    in response to estimating the age of the individual:
        accessing a set of sensor data associated with an environment of the vehicle, and
        determining that at least one parameter associated with the set of sensor data meets or exceeds at least one condition.

20. The computer-implemented method of claim 19, wherein the set of sensor data comprises an outside temperature and an operating condition of the vehicle, and wherein determining that the at least one parameter associated with the set of sensor data meets or exceeds at least one condition comprises:
    determining that (i) the outside temperature exceeds a threshold temperature, and (ii) the operating condition of the vehicle is off.

* * * * *